United States Patent
Tan et al.

(10) Patent No.: US 12,361,509 B1
(45) Date of Patent: Jul. 15, 2025

(54) SEMICONDUCTOR PROCESS SIMULATION ON GRAPHICS PROCESSING UNIT (GPU) WITH MULTI-LEVEL DATA STRUCTURE

(71) Applicant: Synopsys, Inc., Sunnyvale, CA (US)

(72) Inventors: Zhiqiang Tan, San Jose, CA (US); Ibrahim Avci, Santa Clara, CA (US); Luis Villablanca, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 212 days.

(21) Appl. No.: 18/453,263

(22) Filed: Aug. 21, 2023

(51) Int. Cl.
  *G06T 1/60* (2006.01)
  *G06T 1/20* (2006.01)

(52) U.S. Cl.
  CPC . *G06T 1/60* (2013.01); *G06T 1/20* (2013.01)

(58) Field of Classification Search
  CPC .................................. G06T 1/20; G06T 1/60
  USPC ........................................................ 345/530
  See application file for complete search history.

(56) References Cited

PUBLICATIONS

Alin Murarasu et al., Compact Data Structure and Scalable Algorithms for the Sparse Grid Technique, ACM SIGPLAN Notices, vol. 46, Issue 8, Feb. 12, 2011, pp. 25-34.*
Sylvain Lefebvre et al., Compressed Random-Access Trees for Spatially Coherent Data, Eurographics Symposium on Rendering Techniques, Eurographics, Grenoble, France, Jun. 25, 2007, pp. 339-349.*
Adalsteinsson, D., et al., "A Fast Level Set Method for Propagating Interfaces," Journal of Computational Physics, vol. 118, Issue 2, 1995, pp. 269-277.
Adalsteinsson, D., et al., "A Level Set Approach to a Unified Model for Etching, Deposition, and Lithography II: Three-Dimensional Simulations," Journal of Computational Physics, vol. 122, Issue 2, 1995, pp. 348-366.
Ertl, O., "Numerical Methods for Topography Simulation," Dissertation for Doctorate, Technischen Universität Wien, May 2010, 159 pages.
Jaiganesh, J., et al., "A High-Performance Connected Components Implementation for GPUs," In Proceedings of the International ACM Symposium on High-Performance Parallel and Distributed Computing, Tempe, Arizona USA, Jun. 2018 (HPDC'18), 13 pages.
Jalba, A. C., et al., "Fast Sparse Level Sets on Graphics Hardware," in IEEE Transactions on Visualization and Computer Graphics, vol. 19, No. 1, pp. 30-44, Jan. 2013.

(Continued)

*Primary Examiner* — Jacinta M Crawford
(74) *Attorney, Agent, or Firm* — Davenport IP Law, PLLC (57) ABSTRACT

In an example, a multi-level data structure is defined including fine grid (FG) and coarse levels. The FG level is configured to store FG data of FG points. The coarse level is configured to store, for a respective chunk of FG points, compressed FG data and/or a pointer to corresponding FG data of the respective chunk. First chunks are identified by a graphics processing unit (GPU) and include each chunk of the FG points including one or more of: (i) that includes a FG point in a level set layer L0 (LSL0), and (ii) that neighbors a chunk that includes the FG point in the LSL0. Memory of the GPU is allocated for the first chunks that have respective compressed FG data to be decompressed. Level set values of the FG points in the LSL0 stored in the FG level in the allocated memory are updated by the GPU.

20 Claims, 7 Drawing Sheets

(56) References Cited

PUBLICATIONS

Museth, K., "VDB: High-Resolution Sparse vols. with Dynamic Topology," ACM Trans. Graph. 32, 3, Article 27 (Jun. 2013), 22 pages.

Roberts, M., et al., "A Work-Efficient GPU Algorithm for Level Set Segmentation," In Proceedings of the Conference on High Performance Graphics (HPG '10). Eurographics Association, Jun. 25-27, 2010, Saarbrucken, Germany, 123-132.

Sethian, J.A., "Level Set Methods, and Fast Marching Methods: Evolving interfaces in computational geometry, fluid mechanics, computer vision, and materials science," Cambridge University Press, Copyright 1999, Reprinted 2002, Chapters 1 (pp. 3-13), 3 (pp. 29-33), 6 (pp. 60-74), 7 (pp. 77-85), 21 (pp. 313-356).

\* cited by examiner

SEMICONDUCTOR PROCESS SIMULATION ON GRAPHICS PROCESSING UNIT (GPU) WITH MULTI-LEVEL DATA STRUCTURE

TECHNICAL FIELD

The present disclosure generally relates to a semiconductor process simulation system. In particular, the present disclosure relates to performing semiconductor process simulation on a graphics processing unit (GPU) with a multi-level data structure.

BACKGROUND

Designing a circuit may be an arduous process, particularly for today's complex System-on-Chip (SoC) circuits. The circuit design is commonly thoroughly tested to ensure functionality, specifications, and reliability. The importance of these tests prior to tape out and fabrication is significant as the costs and complexity of tape out and fabrication is substantial. Fabricating a circuit that does not meet the necessary specification, does not operate as intended, and/or is not reliable may result in large, wasted costs. However, the speed with which technology is evolving is driving the desire to reduce the time that these tests, and any resulting debug or redesign, use.

SUMMARY

An example is a method. A multi-level data structure is defined. The multi-level data structure includes a fine grid level and a coarse level. The fine grid level is configured to store fine grid data of fine grid points. The fine grid points are in a fine grid representing a substrate. The coarse level is configured to store, for a respective chunk of fine grid points, one or more of compressed fine grid data and a pointer to corresponding fine grid data of the respective chunk of fine grid points in the fine grid level. First chunks of the fine grid points are identified by a graphics processing unit (GPU). The first chunks include each chunk of the fine grid points including one or more of: (i) that includes a fine grid point in a level set layer L0, and (ii) that neighbors a chunk that includes the fine grid point in the level set layer L0. Memory of the GPU is allocated, by the GPU, for the identified first chunks of fine grid points that have respective compressed fine grid data to be decompressed in the fine grid level. Level set values of the fine grid points in the level set layer L0 stored in the fine grid level in the allocated memory are updated by the GPU.

Another example is a method. A multi-level data structure is stored in memory of a GPU. The multi-level data structure includes a fine grid level and a coarse level. The fine grid level is configured to store fine grid data of fine grid points. The fine grid points are in a fine grid representing a substrate. The coarse level is configured to store, for a respective chunk of fine grid points, compressed fine grid data or a pointer to corresponding fine grid data of the respective chunk of fine grid points in the fine grid level. A level set layer L0 pointer list including respective pointers to the memory storing fine grid data in the fine grid level corresponding to fine grid points within half of a grid spacing from a front is created by accessing the multi-level data structure by the GPU. The grid spacing is a spacing between neighboring fine grid points in the fine grid. A level set layer L1 pointer list including respective pointers to the memory storing fine grid data in the fine grid level corresponding to fine grid points that neighbor a respective fine grid point that has a corresponding pointer in the level set layer L0 pointer list is created by accessing the multi-level data structure by the GPU. Level set values of fine grid points are updated, by the GPU using pointers of the level set layer L0 pointer list and pointers of the level set layer L1 pointer list, including evolving the front.

A further example is a non-transitory computer-readable medium including stored instructions. The instructions, which when executed by a GPU, cause the GPU to: resize memory of the GPU for fine grid data of chunks of fine grid points, create a pointer list including pointers to the allocated memory for fine grid points within a half grid spacing to a front, and update fine grid data stored in the allocated memory using pointers of the pointer list. The fine grid points are in a fine grid representing a substrate. Resizing memory includes allocating memory for chunks of fine grid points having compressed data that is to be decompressed.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to semiconductor process simulation on a graphics processing unit (GPU) with a multi-level data structure. Technology computer-aided design (TCAD) refers to the use of computer simulation to develop and optimize semiconductor process technologies and devices. Simulating a semiconductor process, such as an etch or deposition process, has been performed using data processing exclusively on a central processing unit (CPU). A CPU is generally a powerful computational device that may perform a wide array of functionality. However a CPU may be configured for sequential operation and does not parallelize operations in high quantities.

Examples described herein relate to a multi-level data structure for fine grid data that represents a substrate upon which a semiconductor process is simulated. The multi-level data structure enables transferring computations of a level set methodology to a GPU from a CPU in a computer system. The level set method may be used in simulating semiconductor etching and deposition processes. The multi-level data structure enables parallelization of computations distributed across multiple cores of the GPU. In some examples, the multi-level data structure is a two-level data structure, which may also be referred to as a two-level hierarchical compression data structure.

Technical advantages of the present disclosure include, but are not limited to, enabling simulation of semiconductor processing by using data processing on a GPU in a parallelized manner. A multi-level data structure may permit parallelized data processing in a GPU, which may improve data processing time of the simulation tool. Further, efficient storage may be achieved using the multi-level data structure. The multi-level data structure may permit data compression at various locations and provide memory for a narrow band of data for simulating evolution of a front in a level set method. Accordingly, a multi-level data structure may balance time and memory space for simulation, for example, by performing simulation more efficiently. Other benefits and advantages may be implemented.

Figure 1:
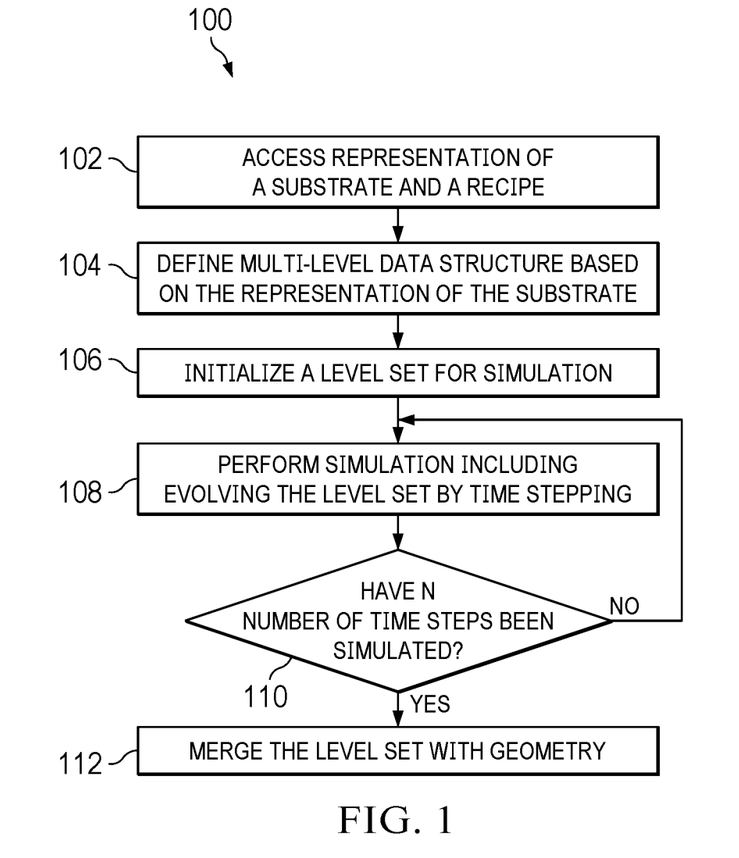
FIG. 1 is a flow chart of simulating a semiconductor process according to some examples.

FIG. 1 is a flow chart of simulating a semiconductor process according to some examples. At 102, a representation of a semiconductor substrate and a semiconductor manufacturing recipe are accessed. The accessing of the representation of the substrate is by a CPU of a computer system. The representation of the semiconductor substrate and the recipe may be accessed from a technology computer aided design (TCAD) application through one or more libraries of application programming interfaces (APIs). The representation of the substrate may be accessed as geometric representations of the substrate, such as a triangulated boundary representation (b-rep), Manhattan-type geometry, or the like.

At 104, a multi-level data structure is defined based on the representation of the semiconductor substrate. The multi-level data structure is defined by the CPU of the computer system. A fine grid may be generated from the representation of the semiconductor substrate or may be accessed as the representation of the semiconductor substrate. The fine grid includes fine grid points in a three-dimensional (3D) Cartesian grid, where the fine grid points each include data corresponding to the representation of the semiconductor substrate at the respective fine grid point. The multi-level data structure includes a coarse level and a fine grid level. The coarse level includes compressed fine grid data for respective chunks of fine grid points and/or pointers to fine grid data in the fine grid level for chunks of fine grid points. The compressed fine grid data is data where, for each data type for a fine grid point, the data is uniform across the fine grid points for the respective chunk of fine grid points. The compressed fine grid data for a chunk of fine grid points may be a single set of data that is maintained in the coarse level data for the fine grid points of the chunk. When data for any data type for a fine grid point is not uniform across a given chunk, the respective sets of data for the fine grid points of a chunk are maintained in the fine grid level, with each set of data corresponding to a respective fine grid point. The coarse level maintains the structure of the fine grid, which may be implicit by the structure of the coarse level and/or explicit by data stored in the coarse level. The fine grid level may be maintained in any order and/or unstructured between chunks of fine grid points and may maintain the data of a respective chunk to maintain the structure of the fine grid points within that chunk, either explicitly or implicitly.

Figure 2A:
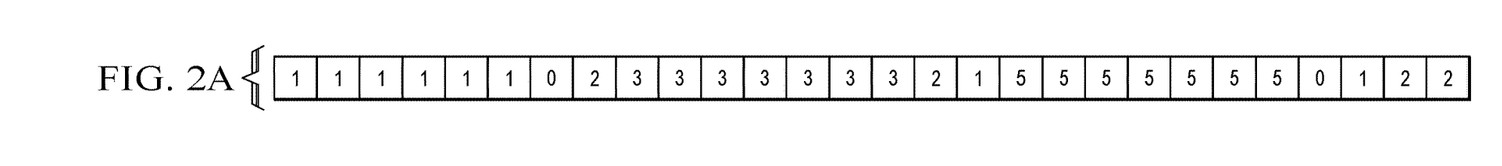
FIGS. 2A, 2B, 2C, 2D, and 2E illustrate how a multi-level data structure may be defined according to some examples.

FIGS. 2A, 2B, 2C, 2D, and 2E illustrate how a multi-level data structure may be defined according to some examples. The example in FIGS. 2A through 2E shows one-dimensional data for simplicity; however, a 3D example or two-dimensional (2D) example may be extrapolated from the illustrated example. FIG. 2A shows data from the representation of the semiconductor substrate. Any geometric relationship to the data may be implicit in the structure of the data. For example, as described herein, the data structure is to be mapped as a 3D Cartesian coordinate grid. FIG. 2A shows the data for twenty-eight fine grid points as an example.

Figure 2B:
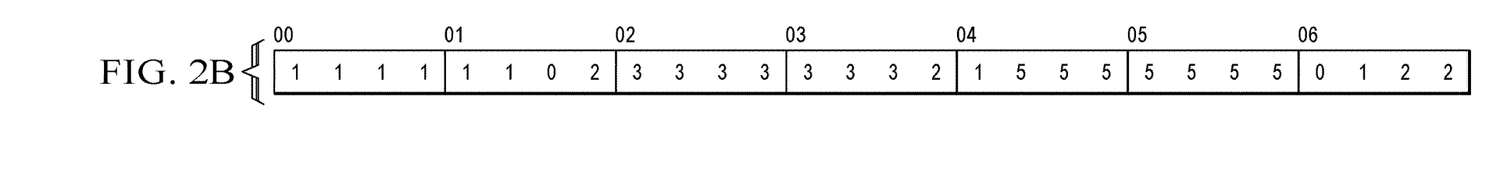
Figure 2C:
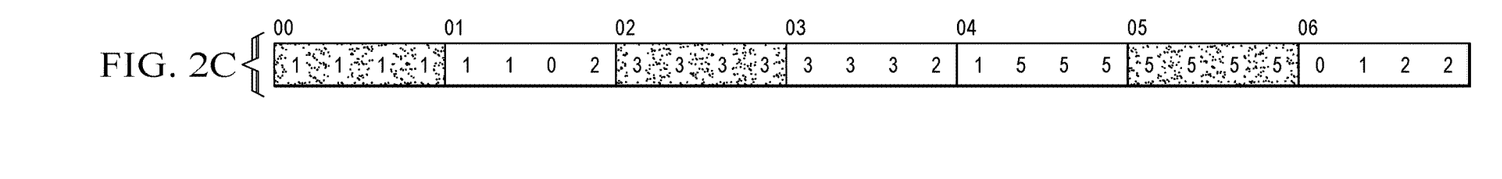

In FIG. 2B, the data of the fine grid points are collected in chunks, with each chunk containing the data of four fine grid points in this example. FIG. 2B shows seven chunks, from chunk 00 to chunk 06. In FIG. 2C, any chunk in which the data for the respective contained fine grid points are uniform is identified. In the illustrated example, chunks 00, 02, 05 are identified as having uniform data for the respective contained fine grid points. For example, the data of each fine grid point in chunk 05 is "5".

Figure 2D:
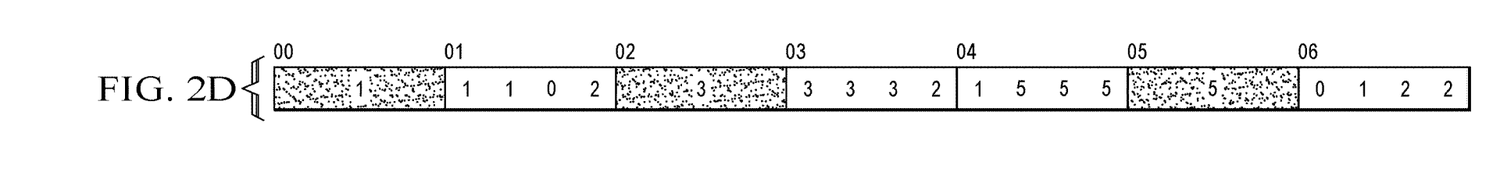

In FIG. 2D, the data of the fine grid points in each identified chunk (with uniform fine grid point data) is compressed. The compressed fine grid data represents data for each fine grid point represented by the chunk (e.g., as shown by FIGS. 2A, 2B, and 2C). For example, chunk 05 includes compressed fine grid data of "5" representing the "5" of each of the fine grid points.

Figure 2E:
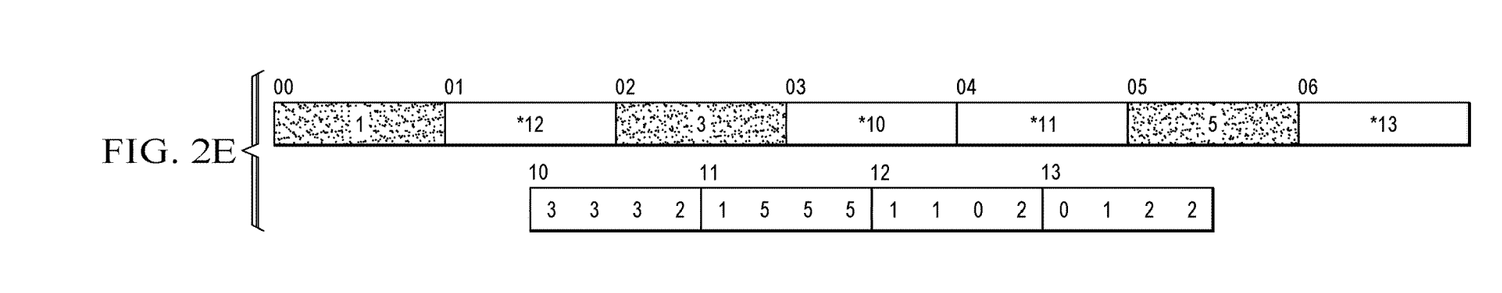

FIG. 2E shows a resulting multi-level data structure. In this example, the multi-level data structure is a two-level data structure. The multi-level data structure includes a coarse level and a fine grid level. The coarse level includes compressed fine grid data for uniform data for fine grid points of a respective chunk. The coarse level also includes a pointer to a chunk maintained in the fine grid level. The fine grid level includes chunks in which non-uniform data of the fine grid points of a respective chunk is collected. The fine grid level may, in some examples, not be structured relative to chunks maintained in the fine grid level. In such examples, the coarse level is structured in a manner to maintain the fine grid. The fine grid may be maintained within a chunk (e.g., a relationship between fine grid points within the respective chunk) by the structure of a chunk of fine grid points in the fine grid level. In the illustrated example, the coarse level data 00 is compressed fine grid data of "1"; the coarse level data 01 is a pointer to chunk 12 in the fine grid level; coarse level data 02 is compressed fine grid data of "3"; etc.

The data for a fine grid point may include any data appropriate for a given simulation. In some examples, a fine grid point includes a signed field, which indicates whether the respective fine grid point is within or outside of a front implemented in a level set methodology. The front refers to an interface and the level set method tracks the movement or deformation of the interface. In some examples, the signed field includes a positive indication or a negative indication, where a positive indication indicates that the fine grid point is outside of the front, and a negative indication indicates that the fine grid point is within the front. The data for a fine grid point may also include material data relating to a material represented to be on the substrate at that fine grid point. The material data may be used for etch rates or deposition rates (e.g., for epitaxy or atomic layer deposition (ALD)) during a simulation. Other data may be included in the data for a fine grid point.

Referring back to FIG. 1, at 106, a level set is initialized for simulation. The level set is initialized by mapping the geometric representations of the representation of the substrate onto the fine grid. For example, the signed fields of fine grid points may be determined and assigned to the respective fine grid points. Also, distance values of the fine grid points (e.g., distances from the fine grid points to the level set) may be assigned to the respective fine grid points. Mapping the geometric representations onto the fine grid may be performed by the CPU of the computer system.

Although described separately, the operations at 104, 106 may be closely related. For example, memory may first be allocated for the multi-level data structure at 104 assuming no compression of any fine grid data. Once the level set is initialized at 106, the multi-level data structure may be defined with any appropriate compression of fine grid data, and memory may be deallocated once compression has occurred.

Subsequently, the CPU of the computer system writes the multi-level data structure to a memory space of a GPU of the computer system. For example, the CPU may write the multi-level data structure to global memory in the GPU of the computer system. Writing the multi-level data structure to the memory space of the GPU transfers data processing of the simulation to the GPU. The multi-level data structure permits data processing of the simulation to be performed in a parallelized manner by the GPU. Cores of the GPU may process various chunks independently of other chunks. The coarse level maintains the structure of the fine grid such that memory for chunks may be unstructured between the chunks.

At 108, a simulation is performed in which the level set is evolved by time stepping. The simulation is performed by the GPU of the computer system. The evolution of the level set includes moving the front and tracking the movement by updating the multi-level data structure, which may include updating data values, allocating memory for decompression of data, and/or deallocating memory for compression of data. Any level set method may be used to move the front. A level set method generally solves a partial differential equation, known as the Hamilton-Jacobi equation as shown below.

$$\frac{\partial \phi}{\partial t} + H(r, t, n, \ldots) = 0$$

The $\phi$ is the level set being solved, which is a function position r and time t. The Hamiltonian H depends on position r, time t, local front normal n, local material type, incoming beam distribution and visibility, etc. The above equation may be applicable to semiconductor processing based on a direct beam, such as etching and deposition. The equation may be modified to accommodate other semiconductor processes.

The movement of the front may be tracked in the multi-level data structure with help of a dilation operator. Dilation includes identifying fine grid points at the front and designating those fine grid points as level set layer L0. Subsequently, and iteratively, fine grid points not designated to a level and a neighboring grid point designated as a given level are designated as the next given level. In some examples, in conjunction with designating level set layers, chunks of fine grid points are identified for memory allocation in the GPU. The memory may further be resized by deallocating previously allocated memory.

Figure 3:
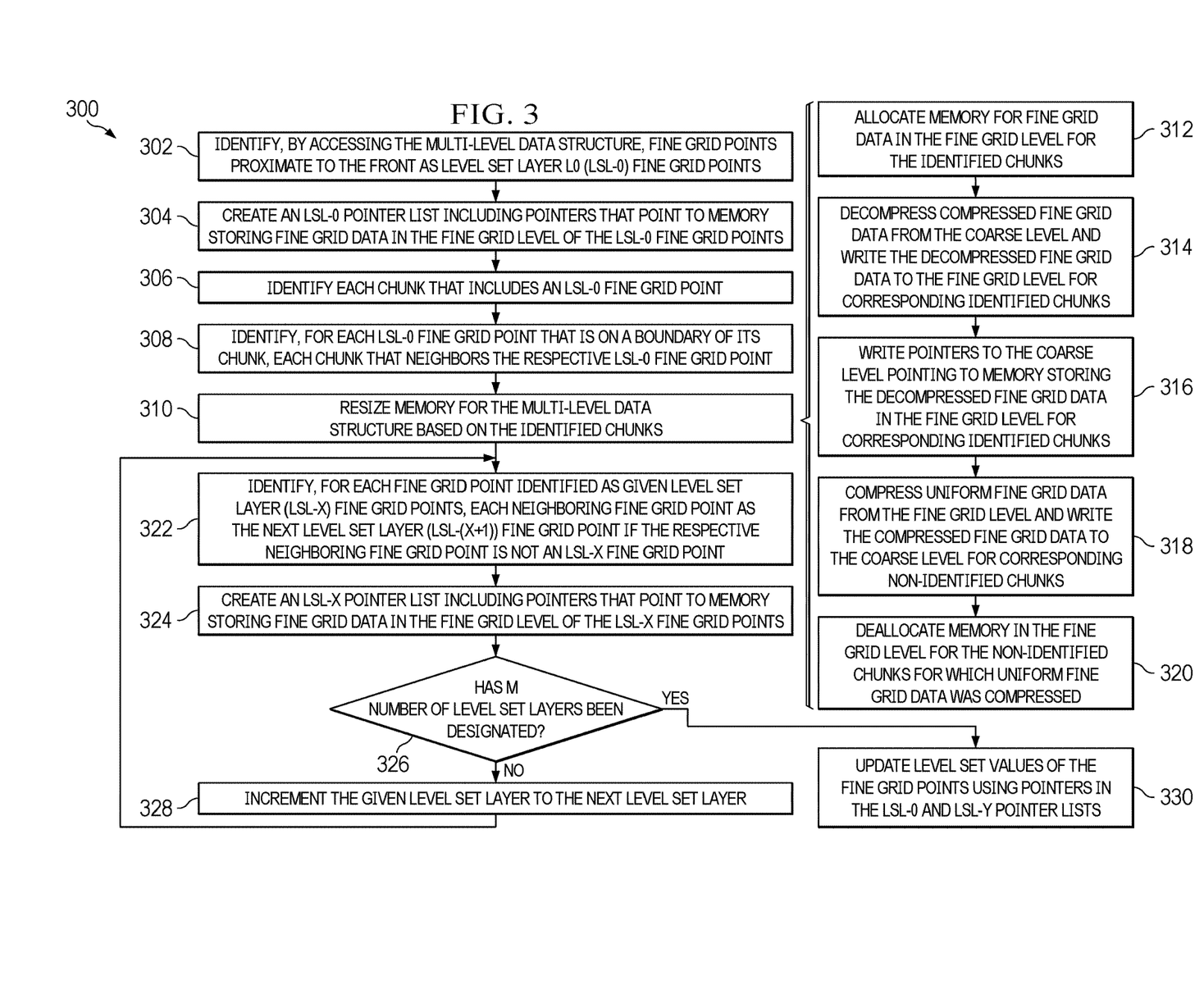
FIG. 3 is a method for allocating memory and tracking front movement in a fine grid according to some examples.

FIG. 3 is a method 300 for allocating memory and tracking front movement in a fine grid according to some examples. At 302, fine grid points proximate to the front (e.g., satisfying a threshold) are identified as level set layer L0 (LSL-0) fine grid points. The identification of the LSL-0 fine grid points is by the GPU accessing the multi-level data structure to identify locations in memory (e.g., addresses) where fine grid data in the fine grid level of the LSL-0 fine grid points is stored and to identify the corresponding location of the fine grid points in the fine grid. At 304, an LSL-0 pointer list including pointers that point to memory storing fine grid data in the fine grid level of the LSL-0 fine grid points is created. The locations in memory (e.g., addresses) accessed in the identification of the LSL-0 fine grid points are used to populate the LSL-0 pointer list. The LSL-0 pointer list may be a 3D array that represents positions of fine grid points.

In some examples, a fine grid point is identified as an LSL-0 fine grid point when the front is within half a grid spacing between neighboring fine grid points. Further, in some examples, the 3D Cartesian coordinate grid that the fine grid points populate may have uniform spacing along x, y, and z directions such that $\Delta x = \Delta y = \Delta z$, where $\Delta x$ is the distance between neighboring fine grid points along an x-direction, $\Delta y$ is the distance between neighboring fine grid points along a y-direction, and $\Delta z$ is the distance between neighboring fine grid points along a z-direction. Hence, in such examples, a fine grid point may be identified as an LSL-0 fine grid point when the fine grid point is within 0.5 h of the front, where $h = \Delta x = \Delta y = \Delta z$.

At 306, each chunk that includes an LSL-0 fine grid point is identified. Identifying such chunks of fine grid points may be by the GPU accessing the multi-level data structure to identify locations in memory (e.g., addresses) where data (e.g., pointers) in the coarse level corresponding to the chunks is stored and to access the data (e.g., pointers) in the coarse level to determine whether an LSL-0 fine grid point is included in a chunk of fine grid points stored in the fine grid level and pointed to by the data in the coarse level. The locations in memory (e.g., addresses) that store data (e.g., pointers) in the coarse level are used to populate a resizing pointer list created and maintained by the GPU. Identifying such chunks may be an atomic operation.

At 308, for each LSL-0 fine grid point that is on a boundary of its chunk of fine grid points, each chunk that neighbors the respective LSL-0 fine grid point is identified. Similar to 306, identifying such chunks of fine grid points may be by the GPU accessing the multi-level data structure to access the data (e.g., pointers) in the coarse level to determine whether an LSL-0 fine grid point is included in a chunk of fine grid points stored in the fine grid level and pointed to by the data in the coarse level, to determine whether the LSL-0 fine grid point is on a boundary of the chunk based on the structure of the fine grid level, to determine a chunk neighboring the LSL-0 fine grid point based on the structure of the coarse level, and to determine a location in memory (e.g., address) storing data (e.g., a pointer) in the coarse level corresponding to that chunk. The locations in memory (e.g., addresses) that store data (e.g., pointers) in the coarse level are used to populate the resizing pointer list.

Figure 4A:
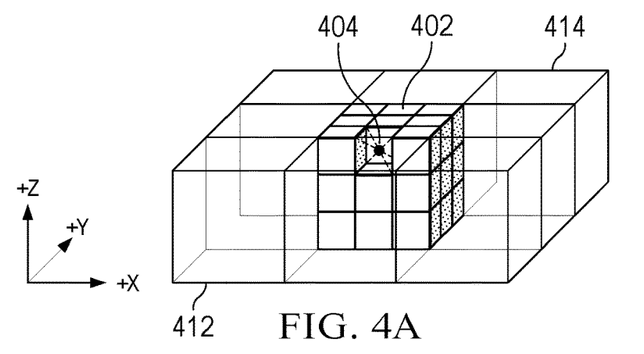
FIGS. 4A, 4B, and 4C illustrate chunks in a three-dimensional (3D) Cartesian coordinate grid according to some examples.
Figure 4B:
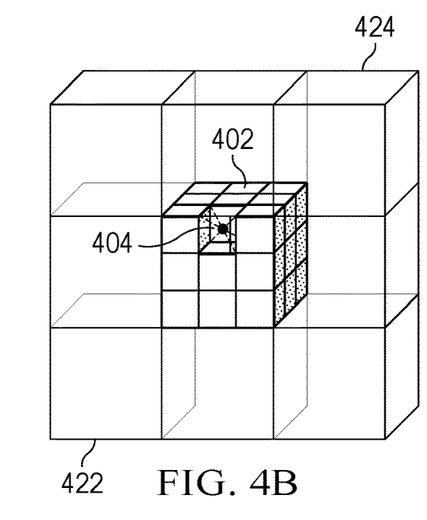
Figure 4C:
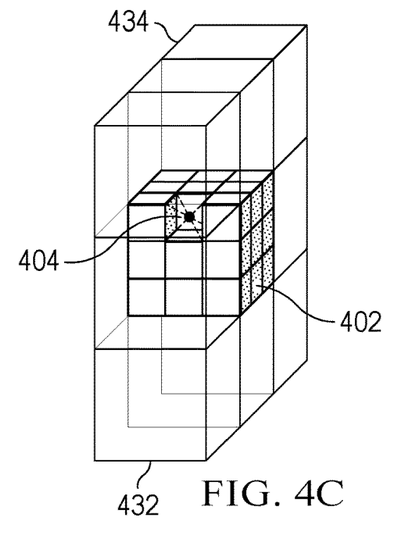

Depending on the structure of the multi-level data structure, an index of a fine grid point within the fine grid level may be used to determine whether the fine grid point is on a boundary of its chunk, and the index may be used to determine in which direction another chunk neighbors the fine grid point. In some examples, a neighboring chunk is in a same x-direction, y-direction, and/or z-direction as the respective chunk. Reference is made to FIGS. 4A, 4B, and 4C to illustrate aspects of identifying neighboring chunks.

FIGS. 4A, 4B, and 4C illustrate chunks in a 3D Cartesian coordinate grid according to some examples. In FIGS. 4A, 4B, and 4C, for ease of reference, a chunk may be indicated by an index indicating a position within the grid. The index is a three-digit index in which the first digit indicates a position along an x-axis, the second digit indicates a position along a y-axis, and the third digit indicates a position along a z-axis. A fine grid point within a chunk may likewise be indicated by a three-digit index indicating a position within the respective chunk. FIGS. 4A, 4B, and 4C, for simplicity, show respective portions of a 3×3×3 grid of chunks, where each chunk contains a 3×3×3 grid of fine grid points.

FIG. 4A shows chunks in an x-y plane. FIG. 4A includes a chunk 402, a chunk 412, and a chunk 414. Chunk 402 is common to FIGS. 4A, 4B, and 4C. The chunk 402 is shown to include fine grid points, including fine grid point 404. Although not illustrated, other chunks include respective fine grid points. The fine grid point 404 has an index of '102' within the chunk 402. Chunks 412, 414 are identified to illustrate indexing in FIG. 4A. The chunk 402 has '111' as its index. The chunk 412 has '001' as its index, and the chunk 414 has '221' as its index. FIG. 4B shows chunks in an x-z plane. FIG. 4B includes the chunk 402, a chunk 422, and a chunk 424. The chunk 422 has '010' as its index, and the chunk 424 has '212' as its index. FIG. 4C shows chunks in a y-z plane. FIG. 4C includes the chunk 402, a chunk 432, and a chunk 434. The chunk 432 has '100' as its index, and the chunk 434 has '122' as its index.

Assume that the fine grid point 404 is identified as an LSL-0 fine grid point. As illustrated, the fine grid point 404 is on two boundaries of the chunk 402. The fine grid point 404 may be determined to be on a boundary by reference to its index-here '102.' In the described structure, indexes of '0' or '2' (e.g., (n-1), where n is the number of fine grid points along the corresponding axis in a chunk) indicate that a fine grid point is along a boundary of its chunk. An index of '0' indicates that a neighboring chunk to be identified is in the negative direction of the corresponding axis, and an index of '2' (e.g., (n-1)) indicates that a neighboring chunk to be identified is in the positive direction of the corresponding axis.

With respect to an x-direction, the '1' of the '102' index of the fine grid point 404 is neither '0' nor '2', and therefore, the fine grid point 404 is not on a boundary orthogonal to the x-direction, as shown in FIGS. 4A and 4B. With respect to a y-direction, the '0' of the '102' index of the fine grid point 404 indicates that the fine grid point 404 is on boundary orthogonal to the y-direction and that a neighboring chunk is in the negative y-direction, as shown in FIGS. 4A and 4C. Hence, the chunk indexed '101' neighboring the chunk indexed '111' containing the fine grid point 404 is identified. With respect to a z-direction, the '2' of the '102' index of the fine grid point 404 indicates that the fine grid point 404 is on boundary orthogonal to the z-direction and that a neighboring chunk is in the positive z-direction, as shown in FIGS. 4B and 4C. Hence, the chunk indexed '112' neighboring the chunk indexed '111' containing the fine grid point 404 is identified.

Referring back to FIG. 3, at 310, memory for the multi-level data structure is resized based on the identified chunks identified in 306, 308. The memory may be in global memory in the GPU. Generally, the memory is resized to accommodate the multi-level data structure for evolution of the front. The front is generally near fine grid points in the identified chunks, and hence, fine grid data (e.g., level set values) of fine grid points in the identified chunks may be updated differently relative to other fine grid points within a respective chunk. Accordingly, resizing the memory may include allocating memory for identified chunks that have compressed fine grid data in the coarse level of the multi-level data structure, where the memory allocated for a respective chunk is to store decompressed fine grid data of fine grid points in the fine grid level of the multi-level data structure. In subsequent iterations, memory allocated for an identified chunk may be maintained, and memory may not be newly allocated for that chunk. Further, once the front has passed a chunk of fine grid points, the fine grid data of the fine grid points of that chunk may be uniform and may be compressed into compressed fine grid data stored in the coarse level of the multi-level data structure. Hence, memory allocated for storing fine grid data in the fine grid level of the multi-level data structure for that chunk may be deallocated.

Resizing the memory may not necessarily occur each iteration (e.g., referring to FIG. 1). For example, in some instances, the identified chunks may not change from one iteration to another iteration, and hence, no memory would need to be allocated or deallocated. Further, when memory may be available for deallocation, that memory may not be deallocated until a threshold amount of memory is available for deallocation. Accordingly, memory that was previously allocated may be available for writing fine grid data in the fine grid level of a subsequently identified chunk. Deallocating memory in such a manner may prevent frequent resizing of allocated memory.

The resizing memory of 310 may include the operations of 312, 314, 316, 318, 320. At 312, memory is allocated for fine grid data in the fine grid level of the multi-level data structure for the identified chunks identified at 308, 310. The size of the memory to be allocated may be at least the number of identified chunks for which memory is not allocated in the current iteration times the size of memory per chunk for fine grid data of fine grid points of a chunk in the fine grid level of the multi-level data structure. The number of identified chunks (identified at 308, 310) may be indicated by the number of pointers in the resizing pointer list. At 314, compressed fine grid data in the coarse level of the multi-level data structure is decompressed, and the decompressed fine grid data is written to the fine grid level of the multi-level data structure for corresponding identified chunks (e.g., written in the memory allocated at 312). The compressed fine grid data in the coarse level may be accessed by pointers in the resizing pointer list. At 316, pointers are written to the coarse level pointing to the memory storing the decompressed fine grid data in the fine grid level for corresponding chunks.

At 318, uniform fine grid data in the fine grid level of a non-identified chunk is compressed, and the compressed fine grid data is written to the coarse level for the corresponding chunk. For example, the coarse level of the multi-level data structure may be traversed, and memory locations (e.g., addresses) of the coarse level that store respective pointers to the fine grid level are compared to the pointers of the resizing pointer list. Any memory location of the coarse level that stores a pointer and is not included in the resizing pointer list may be subject to deallocation of memory for the corresponding chunk. If the fine grid data in the fine grid level pointed to by the pointer of the coarse level for that chunk is uniform, the data of that chunk may be compressed and written to the coarse level for that chunk. At 320, the memory in the fine grid level for the non-identified chunks for which uniform fine grid data was compressed is deallocated.

In some implementations, memory may be allocated or deallocated for the coarse level. For example, if the size of memory for data for a coarse level corresponding to a chunk varies depending on whether compressed fine grid data or a pointer is stored, the memory for the coarse level may be resized to accommodate changes between types of data being stored. In some implementations, the coarse level may have a pointer data type and a compressed fine grid data type, and hence, memory allocated for both data types, regardless of whether the fine grid data is compressed (e.g., one of the data types may contain a null, while the other contains valid data). Hence, in such implementations, memory may not be resized for the coarse level.

At 322, for each fine grid point identified as a given level set layer (LSL-X) fine grid point (e.g., initially, an LSL-0 fine grid point), each neighboring fine grid point is identified as a next level set layer (LSL-(X+1)) fine grid point (e.g., initially, an LSL-1 fine grid point) if the respective neighboring fine grid point is not an LSL-X fine grid point. The identification of the LSL-(X+1) fine grid points is by the GPU accessing the multi-level data structure to identify the locations of the LSL-X fine grid points in the fine grid and to determine locations of the LSL-(X+1) fine grid points in the fine grid. For example, assume a 3D Cartesian coordinate grid that is 3×3×3 of fine grid points without regard to chunks for simplicity, similar to that described with respect to FIGS. 4A through 4C. Fine grid point indexed '111' is an LSL-0 fine grid point. The fine grid point indexed '111' has as neighbors fine grid points indexed '011', '211', '101', '121', '110', and '112'. Assume that the fine grid points indexed '101' and '121' are LSL-0 fine grid points. The fine grid points indexed '101' and '121' are therefore not designated differently. Assume that the fine grid points indexed '011', '211', '110', and '112' were not previously identified as LSL-0 fine grid points. Hence, the fine grid points indexed '011', '211', '110', and '112' are identified as LSL-1 fine grid points. The identification of the LSL-(X+1) fine grid points also determines locations in memory (e.g., addresses) where fine grid data in the fine grid level of the LSL-(X+1) fine grid points is stored. At 324, an LSL-(X+1) pointer list including pointers that point to memory storing fine grid data in the fine grid level of the LSL-(X+1) fine grid points is created. The locations in memory (e.g., addresses) accessed in the identification of the LSL-(X+1) fine grid points are used to populate the LSL-(X+1) pointer list. The LSL-(X+1) pointer list may be a 3D array that represents positions of fine grid points.

At 326, a determination is made whether M number of level set layers has been designated. The M number may be any appropriate number (e.g., 2 or more) for a given level set methodology being implemented. If M number of level set layers has not been designated, at 328, the given level set layer is incremented to the next level set layer (e.g., level set layer L0 incremented to level set layer L1, level set layer L1 incremented to level set layer L2, etc.), and the method 300 loops to 322 to identify fine grid points as the given level set layer fine grid points. The operation at 322 may be iteratively performed to designate fine grid points at the level set layers for the implemented level set methodology.

If M number of level set layers have been designated as determined by 326, at 330, level set values of the fine grid points are updated using pointers in the LSL-0 pointer list and the LSL-Y pointer list(s) (where Y indicates any level set layers for which fine grid points were identified by iteratively performing operations of 322). The level set values may be updated using any appropriate level set methodology. The updating of the level set values evolves the front and represents changes on a substrate due to the simulated process. For example, for a deposition process, level set values of fine grid points that were outside of the front may be updated to be included within the front as material is simulated to be deposited at those fine grid points. Also as an example, for an etch, level set values of fine grid points that were within a front may be updated to be outside of the front as material is simulated to be removed at those fine grid points.

The level set values are written to the fine grid points in the fine grid level of the multi-level data structure by accessing the memory allocated for the fine grid point via pointers stored in the respective LSL-0 or LSL-X pointer lists. For clarity, in some instances, not all fine grid points pointed to by a pointer in a pointer list may have level set values updated. The fine grid data in the fine grid level is accessed for, e.g., rate calculation, level set value updating, visibility, void detection, etc. by pointers of the LSL pointer list(s).

In some examples where material dependency occurs during simulation, fine grid points at a respective level set layer may be separated into different subgroups based on the material type at the respective fine grid points. The different subgroups are then processed separately to implement the respective material dependencies of a process and level set time stepping group by group. An example of material dependency for a process is etch selectivity in an etch process. Different materials may be etched at different rates in the etch process. Hence, for example, fine grid points designated as level set layer L0 are separated into subgroups based on local material at the respective fine grid points. The level set methodology processes each subgroup separately based on the material of the respective subgroup.

In some examples, a location dependent rate scaling function may be implemented to permit modifications to local rates. As an example, a dopant field may affect an etching rate, or an etching rate may be affected by local material density of critical dimension (CD) distribution. A location dependent scaling function may permit modifying the etching rate based on these attributes. The location dependent rate scaling function is converted into an octree. A user may specify an error tolerance for refinement control. The octree may be flattened into an array, which may be suitable for storage in GPU memory. A GPU evaluation may be done by traversing the octree until the leaf octree cells containing the query point is reached and applying trilinear interpolation based on local relative position. For a simple 2D example, suppose the leaf cell containing the query point has corners $f_0=(1, 3)$, $f_1=(2, 3)$, $f_2=(2, 4)$, and $f_3=(1, 4)$, and scaling values at the corners are $f_0=7$, $f_1=8$, $f_2=5$, and $f_3=6$. Suppose the query point is at $p=(1.4, 3.5)$. Then, the local relative position of p in the leaf cell is $(s,t)=((1.4-1)/(2-1), (3.5-3)/(4-3))=(0.4, 0.5)$. The bilinear (which may be trilinear in 3D) interpolation gives $f(p)=$lerp (lerp $(f_0, f_1, s)$, lerp $(f_3, f_2, s)$, t)=lerp (lerp (7, 8, 0.4), lerp (6, 5, 0.4), 0.5)=lerp (7.4, 5.6, 0.5)=6.5. Here, the linear interpolator is lerp (a, b, t)=a+(b-a) t.

In some process simulations, a local rate may be modulated based on local visibility of an incoming beam. For example, some anisotropic etch processes may be based on visibility of an incoming beam. Different visibility techniques may be implemented.

A first visibility technique is a tessellation technique. The tessellation technique is based on an z-buffer approach. The tessellation technique tessellates the zero level set for a union of the level set layer L0 and the level set layer L1 into triangles by a marching cube method. The triangles are projected onto an image. The projection direction is the beam direction being simulated. A distance of the triangles to the image plane is stored by the image. During a query stage, the distance to the image plane from the level set layer L0 and level set layer L1 points are compared with the distances stored in image, which reveals the visibility.

A second visibility technique is a projection technique. In the projection technique, square boundaries of voxels containing zero level set are projected onto an image. The projection direction is the beam direction being simulated. A distance of the square boundaries of the voxels to the image plane is stored by the image. During a query stage, the distance to the image plane from the level set layer L0 and level set layer L1 points are compared with the distances stored in image, which reveals the visibility.

In some process simulations, a local rate may be implemented regardless of directionality of a beam. In some examples, a complex angular dependent beam distribution may be implemented. During a time step, the distribution is randomly sampled to generate a subset of unidirectional beams. Visibility and rate calculations are applied to each unidirectional beam. Smoothness and accuracy of the simulation may be achieved by amortization in time. Such an approach (e.g., using a few (such as 1 to 3) unidirectional beams per time step) may result in complex modeling using relatively little computational resources.

In some simulations, voids may be detected to ensure proper simulation of a process. For example, during an etch process, puncturing an existing void may expose a surface of the void to a beam. During a deposition process, formation of a void may result in no further deposition within the void. A disjoint set technique may be implemented to detect a void during process simulation. Each element of level set layer L0 is visited, and the links of the element and its neighbors are added according to the disjoint set technique. The technique may then reveal connect components of elements of the level set layer L0. A component may be regarded as a void if it does not contain any element neighboring the top gas.

The above-described material dependency, rate scaling, visibility for an incoming beam, rate regardless of beam directionality, and/or void detection may be functions that are parameters of the Hamiltonian H used to determine the front.

Referring back to FIG. 1, at 110, a determination whether N number of time steps have been simulated. If not, the method 100 loops back to 108. If N number of time steps have been simulated, at 112, the level set is merged with geometry. At 112, the GPU hands over data processing back to the CPU of the computer system. The GPU may hand over data processing by writing the multi-level data structure, with the updated values indicating a final front of the level set, to the memory space of the CPU. The CPU converts the values of the data structure into a geometry of proper representation (e.g., polyhedral, triangulated, etc.). The CPU merges the geometry representation into the original geometry on the CPU, finishing the etching or deposition step.

Figure 5:
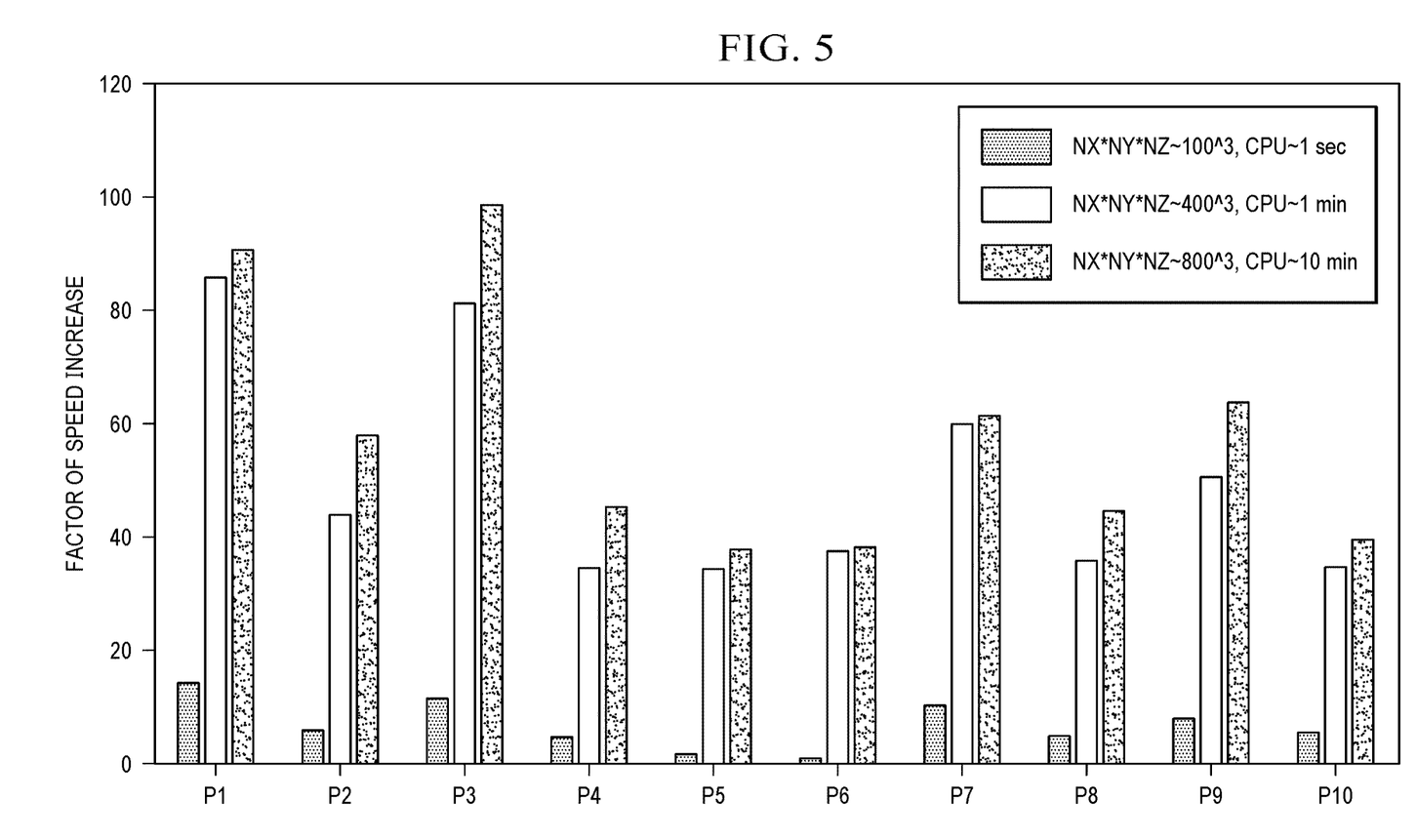
FIG. 5 is a chart showing results of tests comparing an example to another simulation technique.

Tests were performed to observe effects of an example compared to a previous CPU-based simulation. In the example, a GPU having 5,120 cores operating at 898 GB/s was implemented. A 2100 MHz CPU with 2 sockets having 12 cores each, and running 8 threads, was implemented for the CPU-based simulation. In the tests, the example is compared with the CPU counterpart. FIG. 5 is a chart showing the results of the tests. Ten different process simulations P1, P2, . . . . P10 were run to compare the performance under various rates and conditions. Three different grid resolutions (e.g., nx*ny*nz) were tested. A first resolution was 100×100×100 (e.g., 100^3). A second resolution was 400×400×400 (e.g., 400^3). A third resolution was 800×800×800 (e.g., 800^3). The first resolution takes around 1 CPU second in wall clock to complete the level set simulation, excluding geometry conversion. The second resolution takes around 1 minute in wall clock to complete the level set simulation, excluding geometry conversion. The third resolution takes about 10 minutes in wall clock to complete the level set simulation, excluding geometry conversion. As shown in FIG. 5, for the second and third resolutions, the GPU level set implementation generally achieves about 40× increase in speed. In some cases, such as process simulations P1, P3, 80× to 100× increases in speed was observed. For the first resolution (e.g., a small resolution), similar increases in speed may not necessarily be observed because of overhead and because the GPU cores may be less saturated.

Figure 6:
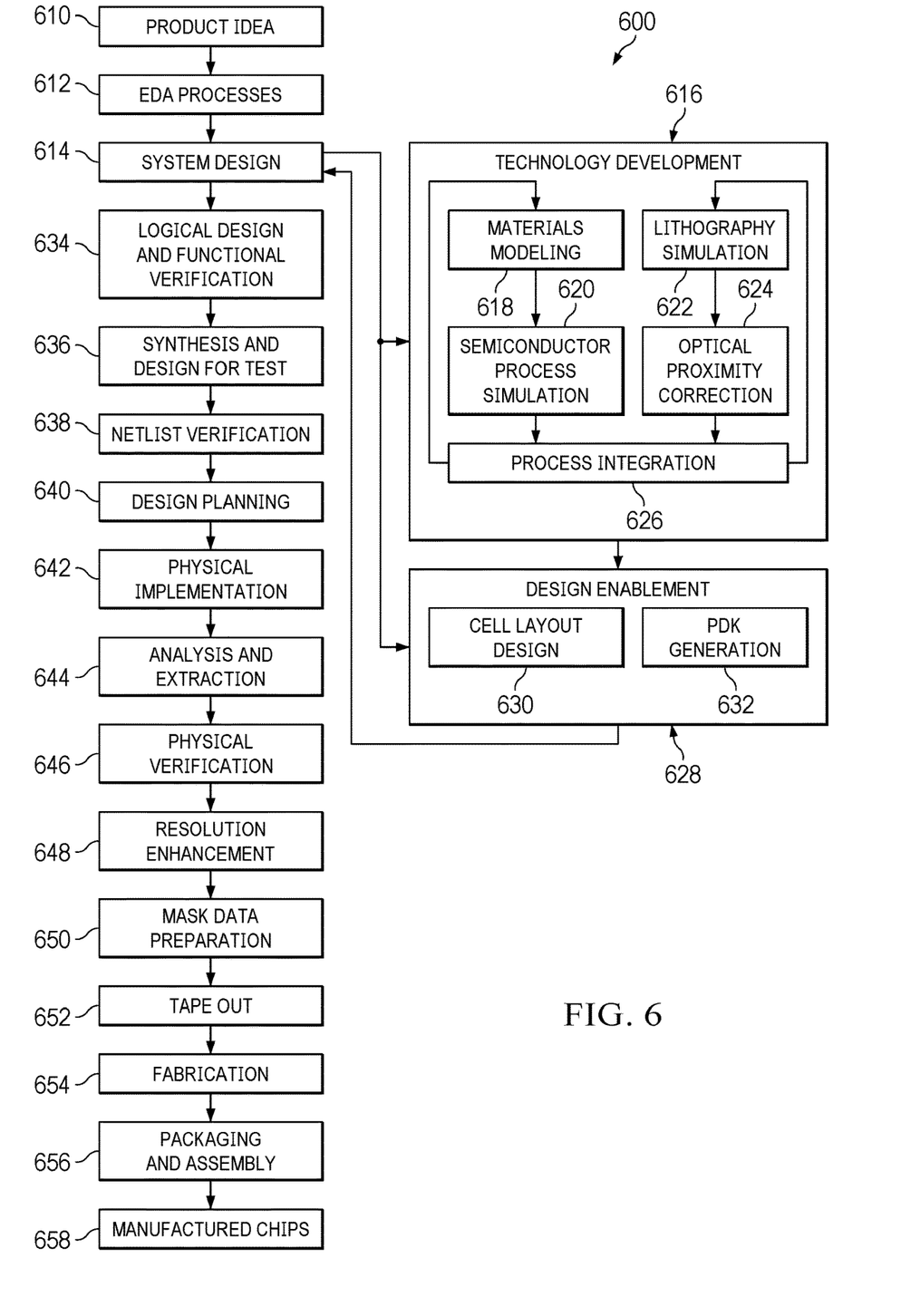
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 652, which is when artwork (e.g., geometric patterns) for the integrated circuit is sent to a fabrication facility to manufacture the mask set, which is then used to manufacture the integrated circuit. After tape-out, a semiconductor die is fabricated 654 and packaging and assembly processes 656 are performed to produce the finished integrated circuit 658.

Specifications for a circuit or electronic structure may range from low-level transistor material layouts to high-level description languages. A high-level of representation may be used to design circuits and systems, using a hardware description language (HDL) such as VHDL, Verilog, System Verilog, SystemC, MyHDL or Open Vera. The HDL description can be transformed to a logic-level register transfer level (RTL) description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 6. The processes described by be enabled by EDA products (or EDA systems).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

Processes may be implemented prior to and/or in parallel with system design 614 to enable system design 614. Technology development 616 may be implemented to develop the semiconductor processes and devices that are available to be incorporated into the system design 614. In technology development 616, materials modeling 618 is developed, which is used in semiconductor process simulation 620 (e.g., TCAD) like described above. Lithography simulation 622 is also performed with optical proximity correction 624. The semiconductor process and lithography are brought together in process integration 626. The operations of technology development 616 may be iterative. Design enablement 628 generates physical cell layout design 630 and process design kit (PDK) generation 632. Cell layouts and PDKs may be attached to schematic and/or logical cells incorporated into a design at system design 614. The cell layouts and PDKs may subsequently be incorporated into a physical design and process development. Technology development 616 and design enablement 628 may also be iterative with system design 614, such as to develop new or specialized cells or processes for a design.

During logic design and functional verification 634, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 636, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 638, the netlist is checked for compliance with timing constraints and for correspondence with the HDL code. During design planning 640, an overall floor plan for the integrated circuit is constructed and analyzed for timing and top-level routing.

During layout or physical implementation 642, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 644, the circuit function is verified at the layout level, which permits refinement of the layout design. During physical verification 646, the layout design is checked to ensure that manufacturing constraints are correct, such as DRC constraints, electrical constraints, lithographic constraints, and that circuitry function matches the HDL design specification. During resolution enhancement 648, the geometry of the layout is transformed to improve how the circuit design is manufactured.

During tape-out, data is created to be used (after lithographic enhancements are applied if appropriate) for production of lithography masks. During mask data preparation 650, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
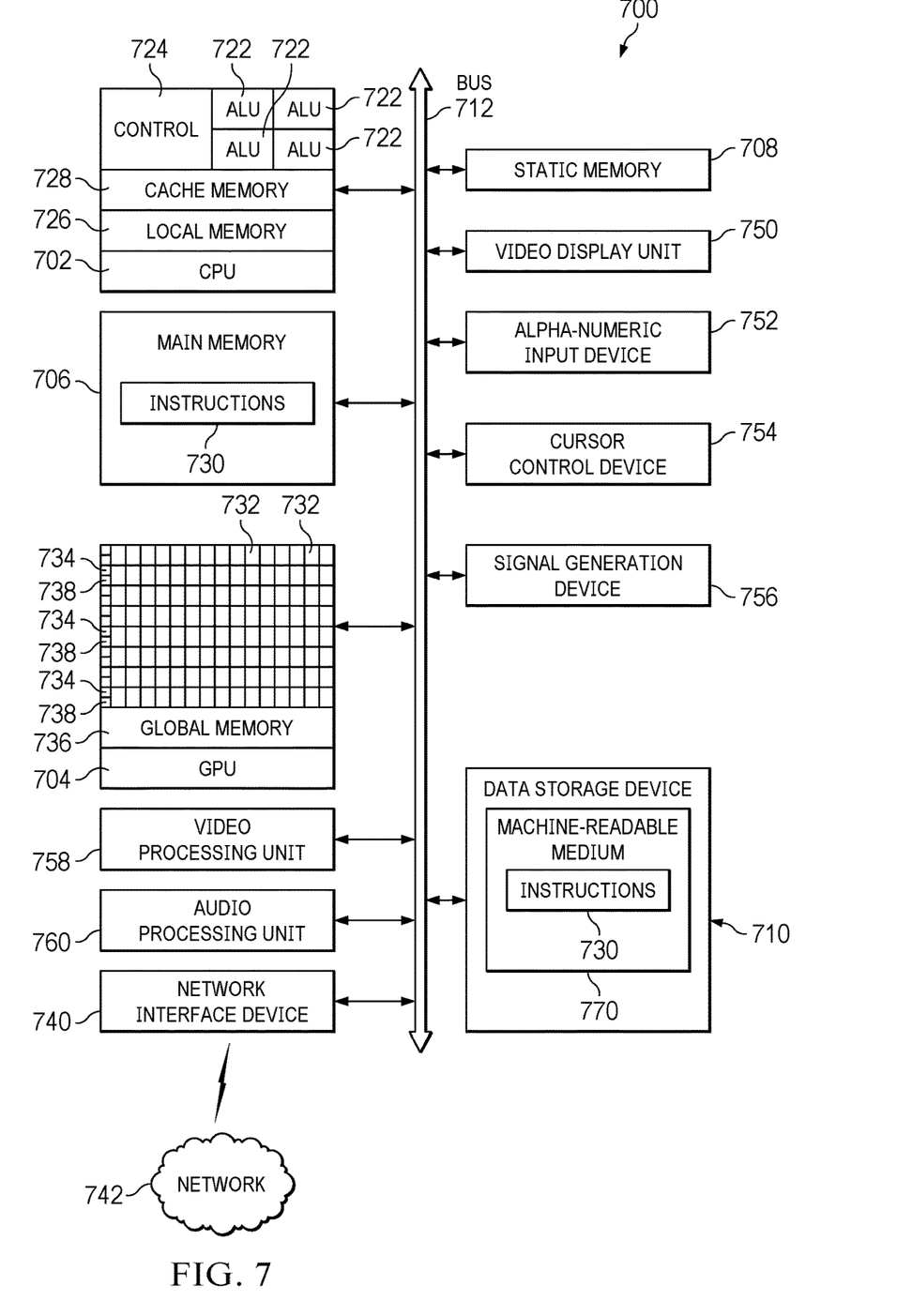
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a central processing unit (CPU) 702, a graphics processing unit (GPU) 704, a main memory 706 (e.g., read-only memory (ROM), flash memory, dynamic random access memory (DRAM) such as synchronous DRAM (SDRAM)), a static memory 708 (e.g., flash memory, static random access memory (SRAM), etc.), and a data storage device 710, which communicate with each other via a bus 712.

The CPU 702 represents one or more processors such as a microprocessor or the like. More particularly, the CPU 702 may be a complex instruction set computing (CISC) microprocessor, a reduced instruction set computing (RISC) microprocessor, a very long instruction word (VLIW) microprocessor, or a processor implementing other instruction sets, or processors implementing a combination of instruction sets. The CPU 702 includes arithmetic logic units (ALUs) 722 (e.g., relatively few ALUs), a control unit 724, local memory 726 (e.g., DRAM, SRAM, or the like), and cache memory 728 (e.g., SRAM, DRAM, or the like). The CPU 702 may be configured to execute instructions 730 for performing the operations and steps described herein as being performed by a CPU.

The GPU 704 represents one or more processors, which may include one or multiple cores. A core may be configured to operate one or multiple operations. For examples, a core may be dedicated to floating point instructions (e.g., 32-bit floating point, 64-bit floating point, etc.), integer instructions (e.g., 32-bit integer), matrix multiplication, or the like. The GPU 704 may be configured for parallelized computation by the cores. The GPU 704 includes ALUs 732 (e.g., a relatively large number of ALUs), control units 734, global memory 736 (e.g., DRAM, SRAM, or the like), and cache memories 738 (e.g., SRAM, DRAM, or the like). The GPU 704 may be configured to execute instructions 730 for performing the operations and steps described herein as being performed by a GPU.

The control unit 724 and ALUs 722 of the CPU 702 may be configured to handle complex tasks and may have a broad spectrum of functionality. The CPU 702 may be suited for complex sequential tasks and may not have many pipelines for parallel processing. The control units 734 and ALUs 732 of the GPU 704 may be configured to handle a narrow range of tasks, which may be relatively simple, such as low-level computations like multiplication, addition, and accumulate. The GPU 704 may be suited for relatively simple tasks that are highly parallelized and may include many cores (e.g., hundreds or thousands of cores) for performing parallelized data process.

The computer system 700 may further include a network interface device 740 to communicate over the network 742. The computer system 700 also may include a video display unit 750 (e.g., a liquid crystal display (LCD) or a cathode ray tube (CRT)), an alphanumeric input device 752 (e.g., a keyboard), a cursor control device 754 (e.g., a mouse), a signal generation device 756 (e.g., a speaker), a video processing unit 758, and an audio processing unit 760.

The data storage device 710 may include a machine-readable storage medium 770 (also known as a non-transitory computer-readable storage medium) on which is stored one or more sets of instructions 730 or software (e.g., libraries) embodying any one or more of the methodologies or functions described herein. The instructions 730 may also reside, completely or at least partially, within the main memory 706, the CPU 702, and/or GPU 704 during execution thereof by the computer system 700, wherein the main memory 706, the CPU 702, and the GPU 704 also constituting machine-readable storage media.

In some implementations, the instructions 730 include instructions to implement functionality corresponding to the present disclosure. While the machine-readable storage medium 770 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the CPU 702 and/or GPU 704 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer.

Such a computer program may be stored in a non-transitory computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable storage medium having stored thereon instructions, which may be used to program a computer system (or other electronic devices) to perform a process according to the present disclosure. A machine-readable storage medium includes any mechanism for storing information in a form readable by a machine (e.g., a computer). For example, a machine-readable (e.g., a computer-readable) storage medium includes a machine-readable (e.g., a computer-readable) storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:
1. A method comprising:
defining a multi-level data structure, the multi-level data structure comprising:

a fine grid level configured to store fine grid data of fine grid points, the fine grid points being in a fine grid representing a substrate; and a coarse level configured to store, for a respective chunk of fine grid points, one or more of compressed fine grid data and a pointer to corresponding fine grid data of the respective chunk of fine grid points in the fine grid level;

identifying, by a graphics processing unit (GPU), first chunks of the fine grid points, the first chunks including each chunk of the fine grid points including one or more of:

(i) that includes a fine grid point in a level set layer L0, and (ii) that neighbors a chunk that includes the fine grid point in the level set layer L0;

allocating, by the GPU, memory of the GPU for the identified first chunks of fine grid points that have respective compressed fine grid data to be decompressed in the fine grid level; and updating, by the GPU, level set values of the fine grid points in the level set layer L0 stored in the fine grid level in the allocated memory.

2. The method of claim 1, further comprising writing the multi-level data structure to the memory of the GPU.

3. The method of claim 1, wherein allocating the memory of the GPU for the identified first chunks of fine grid points includes writing respective pointers to the memory corresponding to the identified first chunks to the coarse level of the multi-level data structure.

4. The method of claim 1, further comprising deallocating, by the GPU, memory of the GPU for second chunks of fine grid points that have fine grid data that is compressed in the coarse level.

5. The method of claim 4, wherein deallocating the memory of the GPU for the second chunks includes compressing the fine grid data of the respective second chunks and writing the compressed fine grid data to the coarse level of the multi-level data structure.

6. The method of claim 1, further comprising creating a level set layer L0 pointer list comprising pointers to the memory storing fine grid data in the fine grid level of the fine grid points in the level set layer L0, wherein updating the level set values includes using pointers of the level set layer L0 pointer list to access the memory for updating the level set values.

7. A method comprising:

storing in memory of a graphics processing unit (GPU) a multi-level data structure, the multi-level data structure comprising:

a fine grid level configured to store fine grid data of fine grid points, the fine grid points being in a fine grid representing a substrate; and a coarse level configured to store, for a respective chunk of fine grid points, compressed fine grid data or a pointer to corresponding fine grid data of the respective chunk of fine grid points in the fine grid level;

creating, by accessing the multi-level data structure by the GPU, a level set layer L0 pointer list including respective pointers to the memory storing fine grid data in the fine grid level corresponding to fine grid points within half of a grid spacing from a front, the grid spacing being a spacing between neighboring fine grid points in the fine grid;

creating, by accessing the multi-level data structure by the GPU, a level set layer L1 pointer list including respective pointers to the memory storing fine grid data in the fine grid level corresponding to fine grid points that neighbor a respective fine grid point that has a corresponding pointer in the level set layer L0 pointer list; and updating, by the GPU using pointers of the level set layer L0 pointer list and pointers of the level set layer L1 pointer list, level set values of fine grid points comprising evolving the front.

8. The method of claim 7, further comprising:

defining, by a central processing unit (CPU), the multi-level data structure in a memory space of the CPU; and writing the multi-level data structure to the memory of the GPU from the memory space of the CPU.

9. The method of claim 7, further comprising:

identifying, by the graphics processing unit, first chunks of the fine grid points that include, or that neighbor a chunk that includes, a fine grid point corresponding to a pointer in the level set layer L0 pointer list; and allocating, by the GPU, memory of the GPU for the identified first chunks of fine grid points that have respective compressed fine grid data to be decompressed in the fine grid level.

10. The method of claim 9, wherein allocating the memory of the GPU for the identified first chunks of fine grid points includes writing respective pointers to the memory corresponding to the identified first chunks to the coarse level of the multi-level data structure.

11. The method of claim 9, further comprising deallocating, by the GPU, memory of the GPU for second chunks of fine grid points that have fine grid data that is to be compressed in the coarse level, wherein deallocating the memory of the GPU for the second chunks includes compressing the fine grid data of the respective second chunks and writing the compressed fine grid data to the coarse level of the multi-level data structure.

12. A non-transitory computer-readable medium comprising stored instructions, which when executed by a graphics processing unit (GPU), cause the GPU to:

resize memory of the GPU for fine grid data of chunks of fine grid points, the fine grid points being in a fine grid representing a substrate, resizing memory comprising allocating memory for chunks of fine grid points having compressed data that is to be decompressed;

create a pointer list including pointers to the allocated memory for fine grid points within a half grid spacing to a front; and update fine grid data stored in the allocated memory using pointers of the pointer list.

13. The non-transitory computer-readable medium of claim 12, wherein the instructions, which when executed by the GPU, cause the GPU to resize the memory further include instructions, which when executed by the GPU, cause the GPU to deallocate memory for chunks of fine grid points having decompressed data that is to be compressed.

14. The non-transitory computer-readable medium of claim 12, wherein the instructions, which when executed by the GPU, cause the GPU to update the fine grid data further include instructions, which when executed by the GPU, cause the GPU to:

separate, into respective material-dependent sub-groups, fine grid data of fine grid points corresponding to different materials on the substrate; and process the material-dependent sub-groups based on material dependency to determine the updated fine grid data.

15. The non-transitory computer-readable medium of claim 12, wherein the instructions, which when executed by the GPU, cause the GPU to update the fine grid data further include instructions, which when executed by the GPU, cause the GPU to use a location dependent rate scaling function to determine the updated fine grid data.

16. The non-transitory computer-readable medium of claim 15, wherein using the location dependent rate scaling function includes:
converting the location dependent rate scaling function into an octree;
searching the octree for a leaf cell containing a query point; and
applying trilinear interpolation based on a relative location of the query point in the leaf cell.

17. The non-transitory computer-readable medium of claim 12, wherein the instructions, which when executed by the GPU, cause the GPU to update the fine grid data further include instructions, which when executed by the GPU, cause the GPU to use a tessellation technique to determine visibility of fine grid points.

18. The non-transitory computer-readable medium of claim 12, wherein the instructions, which when executed by the GPU, cause the GPU to update the fine grid data further include instructions, which when executed by the GPU, cause the GPU to use a projection technique to determine visibility of fine grid points.

19. The non-transitory computer-readable medium of claim 12, wherein the instructions, which when executed by the GPU, cause the GPU to update the fine grid data further include instructions, which when executed by the GPU, cause the GPU to use a disjoint set technique to detect a void.

20. The non-transitory computer-readable medium of claim 12, wherein the instructions, which when executed by the GPU, cause the GPU to update the fine grid data further include instructions, which when executed by the GPU, cause the GPU to determine a local rate comprising:
for each time step of a plurality of time steps, randomly sampling an angular dependent beam distribution to generate a subset of unidirectional beams;
applying visibility and rate calculations to each unidirectional beam of the unidirectional beams; and
amortizing in time results of the visibility and rate calculations applied to the unidirectional beams.

* * * * *